Oct. 6, 1953 N. P. DARASH 2,654,397
SHED CLOSING AND PICK-BACK MECHANISM
Filed Aug. 20, 1949 7 Sheets-Sheet 1

INVENTOR.
NICHOLAS P. DARASH
BY Richey + Watts
ATTORNEYS

INVENTOR.
NICHOLAS P. DARASH
BY Richey & Watts
ATTORNEYS

Oct. 6, 1953     N. P. DARASH     2,654,397
SHED CLOSING AND PICK-BACK MECHANISM
Filed Aug. 20, 1949     7 Sheets-Sheet 6

INVENTOR.
NICHOLAS P. DARASH
BY Richey + Watts
ATTORNEYS

INVENTOR.
NICHOLAS P. DARASH
BY Richey & Watts
ATTORNEYS

Patented Oct. 6, 1953

2,654,397

UNITED STATES PATENT OFFICE 2,654,397

SHED CLOSING AND PICK-BACK MECHANISM

Nicholas P. Darash, Cleveland, Ohio, assignor to The Warner & Swasey Company, Cleveland, Ohio, a corporation of Ohio Application August 20, 1949, Serial No. 111,416

18 Claims. (Cl. 139—56)

This application relates to weaving, especially high-speed weaving, and the control of weaving machinery.

It is an object of the invention to reduce the weaving of defective cloth to a minimum and to enable defects or broken warp threads and weft threads to be repaired or replaced easily and promptly and immediately after the occurrence of a defect. It is an object to avoid the necessity for removing any threads except broken or defective threads in order to correct defects in cloth resulting from thread failure; and it is also an object to avoid any unnecessary labor in picking back or otherwise manipulating the threads or yarns in order to remove defective portions of the woven cloth.

A further object is to shorten interruptions in service of weaving machinery and to overcome likelihood of defects resulting from errors of manipulation.

A more specific object of the invention is to provide accurate and reliable procedures and mechanism for interrupting the weaving process and closing the shed or straightening or leveling the warp when a warp defect occurs and for picking back or reversing the shedding operation when a weft defect occurs.

Still another object of the invention is to provide a highly compact simple construction for manual and automatic warp-straightening and shed reversing attachments for weaving machinery and to enable such attachments to be installed without difficulty in weaving machines already constructed.

Other and further objects, features and advantages of the invention will become apparent as the description proceeds.

The individual operation of the warp let-off control, of the cloth beam control or take-up, of a shedding mechanism or of the pick finder, whereby the shedding operation takes place normally or reversely has already been proposed. In accordance with the present invention, however, the control groups for these purposes are operated and controlled from a centralized means so that it is unnecessary for an operator to attempt to supervise several different operations simultaneously. The invention relates to a weaving machine in which the auxiliary movements are derived from a common operating shaft, especially movements for operating warp let-off, the shedding mechanism, and the cloth take-up. In carrying out the present invention, the mechanism for facilitating removal of defects in the weaving is driven from the same common operating shaft, and all mechanism of the weaving machine derives its power from a common source.

A shedding mechanism of the cam-operated or eccentric type is employed in which there is a normal drive shaft, rotation of which produces the requisite motion of the harness for raising and lowering the healds or heddles in the proper sequence and there is a second control shaft, rotation of which through a fixed angle causes all the heald eyes to be brought to the same position so as to close the shed or straighten the warp. In carrying out the invention in case of a warp defect, the normal weaving machine operation is stopped and the control shaft of the shedding mechanism is rotated sufficiently to close the shed. The shed closing operation may be initiated manually, or the stopping of the weaving machine and the initiation of the shed closing mechanism may take place automatically in response to a warp thread failure. In case of a weft thread failure, the normal operation of the weaving machine is stopped and the shedding mechanism is disconnected from the normal loom operating shaft.

This arrangement facilitates supervision and reliable servicing of the apparatus. It also greatly increases reliability of the weaving machine.

A better understanding of the invention will be afforded by the following detailed description considered in conjunction with the accompanying drawings, in which

Fig. 8 is an elevation view of the left side of the apparatus of Fig. 1 showing the shedder-driving mechanism, take-up and let-off mechanism with automatic and manual stop control, and the pick back arrangement;

Like reference characters are utilized throughout the drawing to designate like parts.

Figure 1:
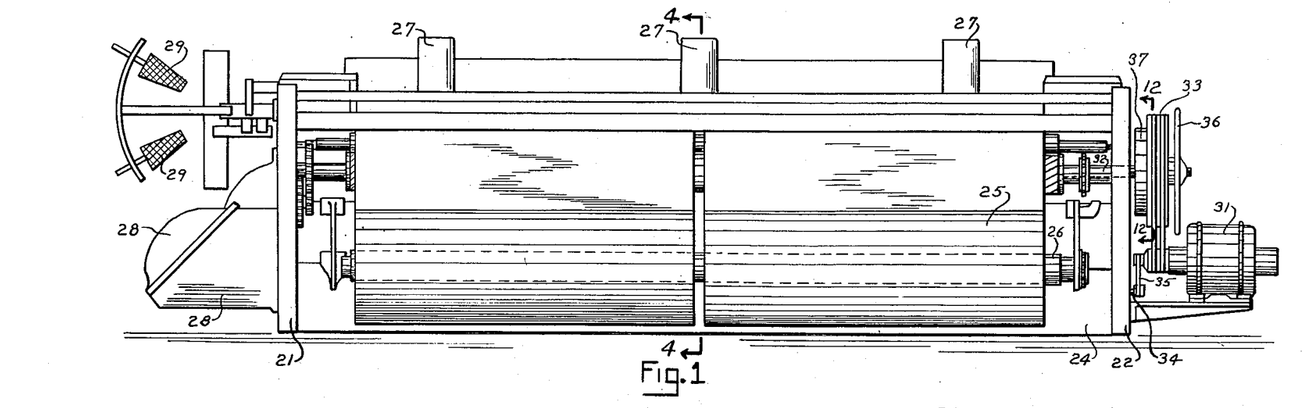
Fig. 1 is a front view of the weaving machine, that is a view as seen from the operator's side.
Figure 4:
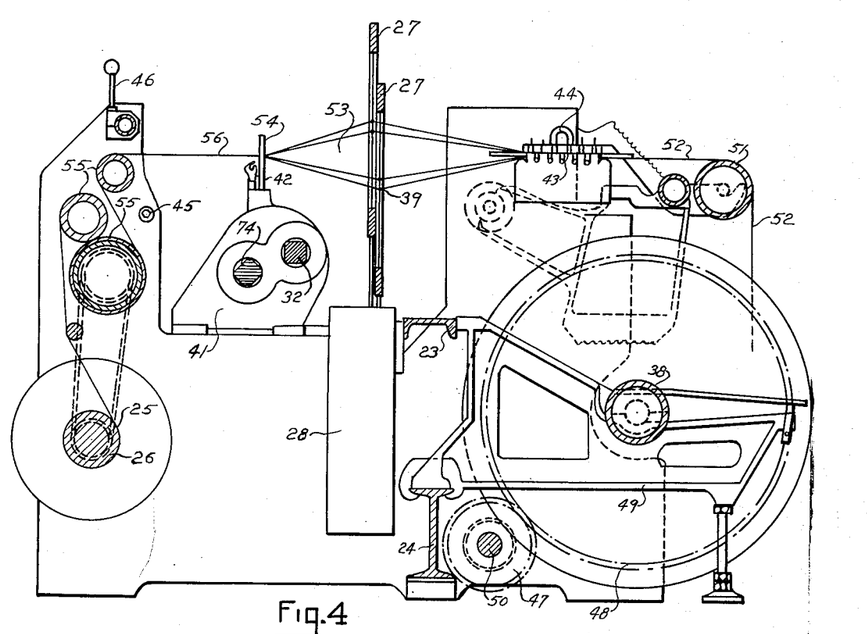
Fig. 4 is a cross-sectional view of the weaving machine of Fig. 1 represented as viewed from the right side.

Referring to the drawings, in the form of apparatus shown by way of illustration, the weaving machine comprises a supporting frame including a pair of side plates 21 and 22 (represented in Fig. 1) secured to cross members 23 and 24, shown in cross-section in Fig. 4. A weaving machine of the gripper shuttle type has been illustrated since the invention is especially useful in such machines, which are adapted to operate automatically at high speed. In Fig. 1 there is visible a roll of cloth 25 which has been wound on the cloth beam 26. There are heddle frames 27 carrying heddles for the weaving machine. Shedding mechanism is enclosed within the housing 28 shown at the left in Fig. 1 and one or more stationary spools or packages 29 are provided for the weft yarns. The machine may be provided with shuttle picking, guiding and conveying mechanism of the general type illustrated in Patents 2,160,338, 2,160,339, 2,316,703, 2,420,380 to Moessinger and 2,099,627 to Rossmann.

In the apparatus represented in Fig. 1 there is an electric motor 31 for providing the driving power, which is adapted both to drive the main shaft 32 through a suitable drive, such as a belt or chain drive 33, and to drive an auxiliary shaft 34 through a suitable drive, such as a belt or chain drive 35. A hand wheel 36 may also be provided for the main drive shaft 32. In order to facilitate rapid stoppage of operating parts of the weaving machine in case of thread failure or failure of some operative part of the weaving machine, an automatically operating clutch and brake mechanism is also provided which is concealed within the drum 37, represented in Fig. 1.

Referring to Fig. 4, the weaving machine includes a warp beam 38, heddle frames 27 carrying heddle eyes 39, a picker box 41 including lay mechanism 42, and the cloth beam 26. There is a conventional supporting bar 43 carrying a plurality of drop wires 44 for an electrical stop mechanism responsive to failure of warp yarn, a stop shaft 45 represented in cross-section in Fig. 4 for producing numerous stop motions, not visible in Fig. 4, including certain conventional stop mechanisms, not described herein, and a manual control handle 46 for starting and stopping the weaving machine. The drop wire 44 constitutes one form of thread-break detector. The wrap beam 38 is provided with a let-off mechanism comprising a gear drive including gears 47 and 48 mounted respectively on a shaft 50 and on the warp beam 38. For removably supporting one or more warp beams for adapting the weaving machine to produce one or more widths of cloth, a supporting frame 49 is provided such as described in greater detail in my U. S. Patent No. 2,514,152. There is a pivoted support for a whip roll 51. A let-off mechanism is provided which will be described in greater detail in connection with Fig. 8. The take-up mechanism for the cloth beam 26 is not visible in Fig. 4, but is shown in Fig. 8, and will be described hereinafter.

During the operation of the weaving machine the warp yarns 52 are drawn from the warp beam 38 over the whip roll 51 through the drop wires 44, through heddles 39, and formed into a shed 53 by the operation of the heddle frames 27 controlled by the shedding mechanism 28. They are then drawn through the dents of the reed 54 carried by the lay mechanism 42 along conventional rolls 55 to the cloth beam 26 in the form of cloth 56. As in conventional gripper-shuttle weaving machines, the weft threads thrown through the shed 53 by the mechanism in the picker box 41, are beaten in by the reed 54 to form the cloth 56. In order to avoid weaving defective cloth in the event of warp breakage, weft failure, or other faulty operation and in order to guard against the weaving of numerous picks of cloth after such a defect has occurred as a result of the high speed of operation of the automatic weaving machine shown, a suitable mechanism is provided for stopping the weaving machine as soon as a warp thread failure, weft fault, or some other failure takes place.

Furthermore, in order to enable the attendant of the weaving machine to remove such a defect quickly and easily the automatic stop mechanism is so arranged as to level the shed or straighten the warp as well as stop all mechanism running from the main drive shaft 32. In addition, mechanism is provided to enable the operator to reverse in part the operation of the weaving machine for one pick at a time or to produce what is known as a "pick back operation" to facilitate removing weft faults. All this is accomplished by the mechanism shown in greater detail in Fig. 8. Leveling the shed enables the operator to detect immediately the location of the broken or faulty warp yarn. Likewise, weft yarn defects are most easily observed and located with the shed level.

Figure 6:
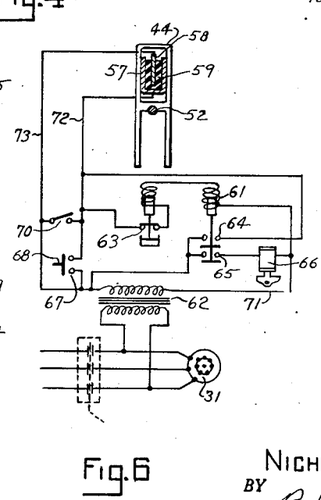
Fig. 6 is an electric circuit diagram of the stop motion for the weaving machine.

The electrical circuit for the automatic stop motion is shown in Fig. 6 wherein one of the drop wires 44 is shown in greater detail resting upon one of the warp threads 52. It will be understood that a separate drop wire 44 is provided for each of the warp threads 52 to detect failure or breakage thereof. For simplicity, however, only one of the drop wires 44 has been shown in Fig. 6, all of which, for the sake of simplicity, are represented in Fig. 4 as resting upon a single supporting bar 43. The bar 43 comprises a U-shaped channel member 57 composed of suitable conducting metal, such as copper, within which is supported a second conducting strip 58 of copper or the like insulated from the channel member 57 by a suitable insulation 59 comprising a plastic, such as a phenolic condensation product or the like. For operating the stop mechanism in response to the falling of the drop wire 44, so as to bridge across the conductors 57 and 58, a relay is provided having an operating coil or winding 61.

A transformer 62 may be provided for supplying control current and preferably a timer 63 is provided for breaking the circuit through the relay 61 a predetermined interval of time, such as fifteen seconds for example, after the relay 61 has been energized. The timer 63 may be a conventional slow-opening, normally closed contactor, represented, for simplicity as being of the dash-pot type. The relay coil 61 is provided with a plunger, not shown, carrying movable contacts cooperating with stationary contacts, or adapted when the coil 61 is energized, to close a pair of normally open, holding contacts 64, and to close a second pair of normally open contacts 65. The latter contacts are connected to the secondary winding of the transformer 62 in series with a solenoid 66, which serves to initiate the stop mechanism described hereinafter. Preferably, normally open contacts 67 of a limit switch 68 (Fig. 10) are provided across the holding contact 64.

In case of failure of the warp thread 52, when the wire 44 drops upon the conductors 57 and 58, an electrical circuit is formed from the secondary winding of the transformer 62 through a conductor 71, the relay winding 61, the normally closed contacts of the timer 63, a conductor 72, the channel shaped conductor rod 57, the drop wire 44, the conductor rod 58, a conductor 73 back to the secondary winding of the transformer 62. As soon as the winding 61 is energized the contacts 64 and 65 close. Accordingly, a holding circuit is provided for the relay 61 which remains energized, even though the drop wires 44 should be lifted before the solenoid 66 has had time to perform its function. The closing of the contacts 65 energizes the solenoid 66 and initiates the machine stoppage and shed leveling operation as will be described hereinafter. Contacts 70 of a schematically represented weft-failure detector, constituting another form of thread-break detector, are also connected to the conductors 72 and 73 in order that failure or breakage of a weft thread will also bring about the stop action described.

Referring to Fig. 8, the picker mechanism in the box 41 is provided with a picker shaft 74 extending through the picker box 41 and driven from the main drive shaft 32 through bevel gearing 75 for enabling the take-up shaft 76 to be driven normally from the picker shaft 74 but disconnected in response to reversing control. A single revolution clutch is provided at the end of the picker shaft 74 including a portion 77 keyed to the shaft 74, axially slideable thereon, and a portion 78 adapted to be disconnected from the portion 77 and to run free for one revolution when the stop mechanism is operated. The member 78 carries a sprocket 81 adapted to drive a sprocket 82, carried by the shaft 76, through a connecting chain 83, which is preferably continued to mesh also with a sprocket wheel 84 connected to a driving shaft 85 for the shedder mechanism 28. Thus a disengageable connection is provided through the clutch parts 77 and 78 between the picker shaft 74 and the take-up shaft 76 as well as the shedder 28. The clutch parts 77 and 78 may be of the type described more fully in Patent No. 2,592,819 to Albert Moessinger, and the form shown includes a spring 79 for normally urging the keyed member 77 into engagement with the clutch member 78.

Figure 7:
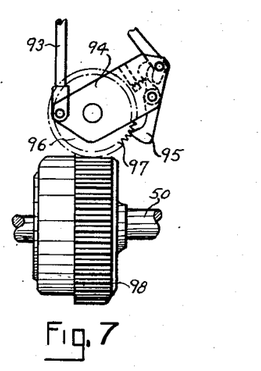
Fig. 7 is a detailed view of a portion of the take-up mechanism for the weaving machine.

For controlling the let-off and take-up motion, the take-up shaft 76 is connected at one end through suitable gearing 86 to the cloth beam 26 and at the outer end through suitable ratchet mechanism 87, for example, to the warp beam 38. The let-off mechanism includes a one-way clutch 88 to which is pivoted a reciprocating arm 89 having a fork 91 at the end cooperating with a collar 92 on a rod 93. The rod 93 is pivoted to a ratchet arm 94, shown in Fig. 7, carrying pawls 95 engaging a ratchet wheel 96 which is, in turn, keyed to a worm wheel 97 meshing with the gear 98 secured to the shaft 50. This, in turn, drives the warp beam 38 through the gearing 47 and 48.

A whip roll mechanism is provided comprising an arm 101 pivoted around a shaft 102. The arm 101 carries the whip roll 51 at one end and is pivotally fastened at the other end to a rod 103. The latter is pivoted at the opposite end to a lever 104 adapted to pivot around a fixed center 105. The opposite end of the lever 104 is pivoted, in turn, to the rod 93 so that oscillation of the rod 93 serves also for picking up slack in the warp yarn. A suitable tensioning spring 106 is provided for the whip roll arm 101 which may be adjustably connected at the upper end to the arm 101, as shown in the drawing.

Figures 2, 3:
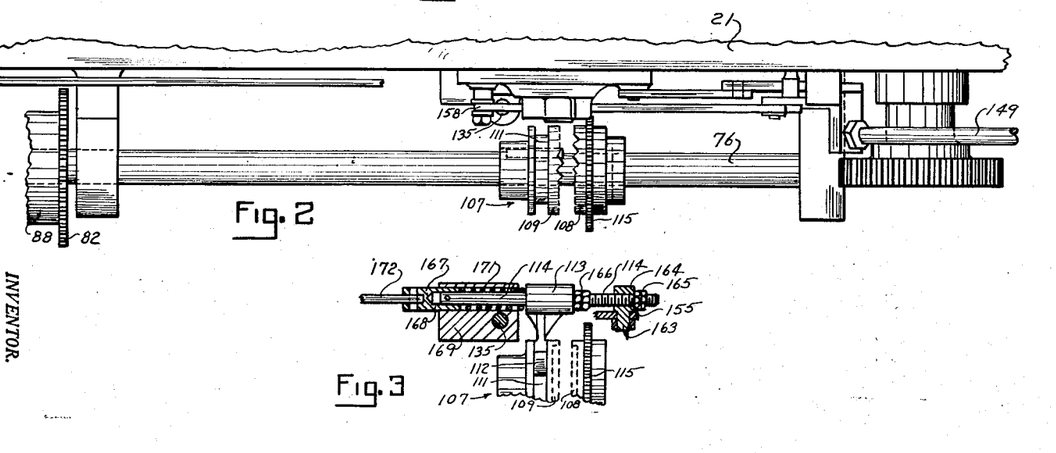
Fig. 2 is a fragmentary top view of the reverse drive for the weaving machine representing a portion of the apparatus shown in greater detail in Fig. 9.
Fig. 3 is a fragmentary view of the engaging mechanism for the toothed clutch represented in Fig. 2.

As shown in Figs. 2 and 8, the take-up shaft 76 also carries a clutch, preferably a toothed clutch 107, comprising two parts, one of which 108 is mounted to run freely on the shaft 76 and the other of which 109 is splined to rotate with the shaft 76 but free to slide axially thereon. Suitable means not shown, but well known to those skilled in the art, are provided for preventing the clutch part 108 from sliding axially with respect to the shaft 76. As shown the clutch parts 108—109 have teeth adapted to mesh with each other when the clutch part 109 is moved axially against the clutch part 108. For controlling the axial movement of the clutch part 109, it is provided with an annular groove 111 cooperating with a finger 112 (Fig. 3) carried by a sleeve 113 mounted on a rod 114.

For effecting the reverse drive when the mechanism has been moved to appropriate positions, the clutch part 108 is arranged to be driven from the motor 31 by providing sprocket teeth 115 meshing with a chain 116 meshing in turn with sprocket 117 on a shaft 118 which carries a gear 119 meshing with a worm 121 secured to the auxiliary shaft 34 shown in Fig. 1. The sprocket 117 and the gear 119 are secured to each other but run free on the shaft 118. In this manner the sprocket 115 and the clutch part 108 are driven continuously during the operation of the main driving motor 31 independently of the engagement or disengagement of the clutch 37 housed in the drum (Fig. 1) controlling the main drive shaft 32.

For effecting the shed closing operation in response to a warp thread failure, there is a half revolution clutch 122 having a driving part fixed to the gear 119 and a driven part fixed to the shaft 118. The shaft 118 extends through the clutch 122 and has secured thereto a sprocket 123 which is connected to the shed-closing or warp-leveling mechanism illustrated in Figs. 13 and 14, to be described in greater detail hereinafter. The half revolution clutch 122 may be of any suitable form for producing a fixed angular rotation of a shaft or the like in response to a release mechanism. Since this clutch does not constitute my present invention it need not be described in detail; but, I have found that satisfactory results may be obtained by utilizing a half revolution clutch of the type manufactured by the Hilliard Corporation of Elmira, New York, as described in Hilliard Bulletin SR-1. Such clutches are provided with a driven part which will rotate a fixed fraction of a revolution, for example one-half revolution, whenever released.

Figure 5:
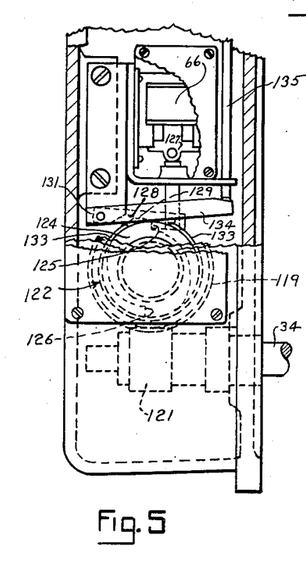
Fig. 5 is a detailed view, partially in cross-section, of a half-revolution clutch and solenoid control forming a part of the automatic stop mechanism and shed leveler controlled by the drop wires shown in Fig. 4.

As illustrated in Fig. 5 of the drawing, the driven part of the clutch secured to the shaft 118 carries a cam member 124 having two diametrically opposite stop portions 125 and 126. The solenoid winding 66 is provided with a plunger 127 to which is connected a pivoted catch 128 including a latch 129 adapted to cooperate with the stop portions 125 or 126 of the clutch cam member 124. The catch 128 is pivoted at the end 131 so that when in the position shown in Fig. 5 it locks one or the other of the stop portions 125 or 126 and prevents rotation of the driven portion of the half revolution clutch 122. The driven portion of the half revolution clutch 122, secured to the shaft 118 also carries a cam 132 including band portions 133 of increased radius intermediate the angular positions of the stop portions 125 and 126 of the cam 124. A cam follower 134 is provided for the cam 132 which may also be pivoted at 131 but is not secured to the catch 128. Cooperating with the cam follower 134 is a vertically slidable rod 135 shown also in Fig. 8.

Figure 9:
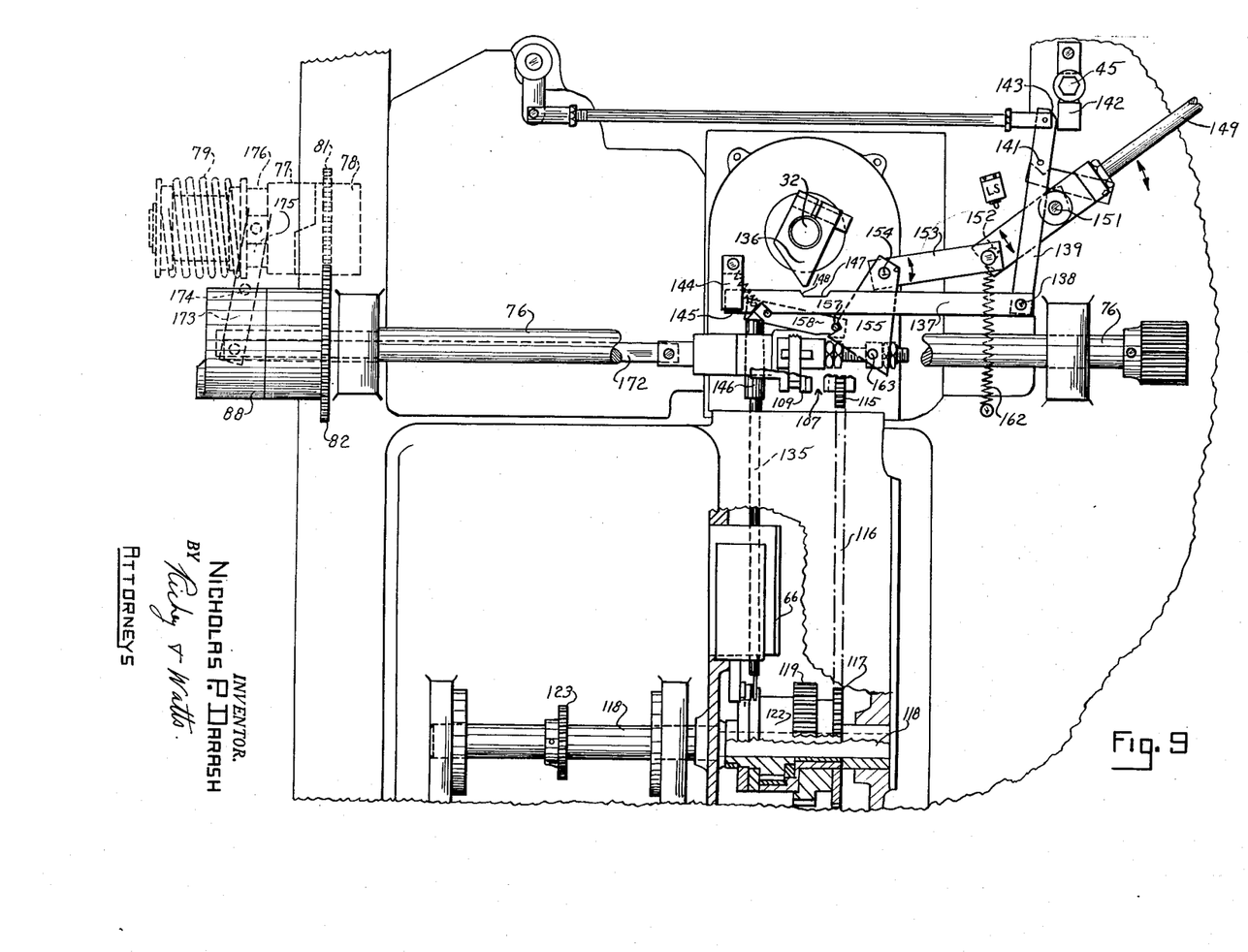
Fig. 9 is an enlarged view of the portion of the apparatus represented in Fig. 8 primarily utilized in accomplishing the pick back operation with the parts shown in the position of normal operation of the weaving machine.
Figure 10:
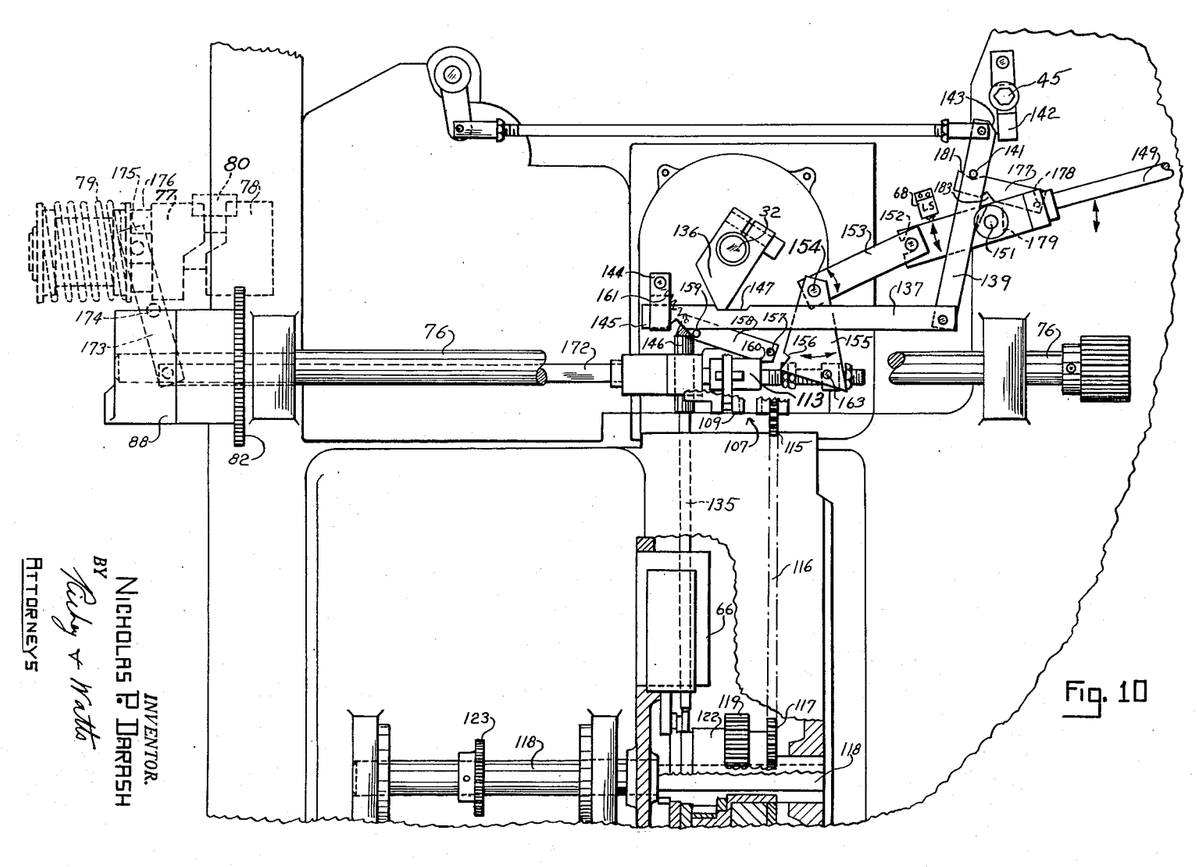
Fig. 10 is a view corresponding to Fig. 9 with the parts shown in the position after pick back has been produced automatically and the manual operating lever has also been thrown into position for an additional pick back operation.

As illustrated in Figs. 8, 9 and 10, for rendering the mechanism responsive to upward movement of the rod 135 by utilizing the power of the main drive shaft 32 for stopping the forward drive mechanism is provided including a dog 136 secured to the main drive shaft 32, and a lever 137 pivoted by a pin 138 to a swinging arm 139 pivoted in turn at a fixed pivot pin 141. The stop shaft 45 of the weaving machine, which is provided for shutting down various parts of the weaving machine mechanism in a conventional manner, is provided with a transversely extending block 142. The lever 139 is extended upwardly, having a cam surface 143, adapted to engage the stop shaft block 142 for operating the stop motion when the lever 139 is rotated clockwise around its fixed pivot pin 141.

A stationary fork-like guide 144 is provided for the freely moving left-hand end 145 of the lever 137 and the upper end of the vertically sliding rod 135 is enlarged to form a plunger head 146 serving as a support for the free end 145 of the lever 137. The lever 137 is also provided with a notch 147 which is adapted to cooperate with the dog 136 on the main drive shaft 32 whereby the dog 136 carries the lever 137 to the left when the rod 135 rises and lifts the notch 147 into engagement with the dog 136. When the rod 135 rises it lifts the lever 137 into the path of the dog 136, so that on the next rotation of the dog 136 the tip thereof engages the edge 148 of the notch 147 and carries the lever 137 on the lower end of the rod 139 to the left, whereby the upper end of the rod 139 and the cam surface 143 are moved to the right against the stop shaft block 142, which turns the stop shaft 45 counterclockwise for effecting the stop motion. One of the functions of the stop shaft is to release the clutch enclosed in the housing 37 (Fig. 1) as will be described in greater detail hereinafter.

The apparatus is so constructed that a single pick is produced by each revolution of the main drive shaft 32. It will, therefore, be seen that not more than one pick can take place during the interval between the rising of the rod 135 and the lever 137 in response to breakage of a warp thread and the engagement of the dog 136 with the edge 148 of the rod 137 for moving it to the left and operating the stop motion.

For manually effecting the reverse drive there is a pick back lever 149 or reversing handle having a fixed pivot 151 and a forked end 152 meshed with a lever 153 having a fixed pivot 154 and having secured to lever 153 a fork 155. The fork 155 has a notch 156 adapted to cooperate with a pin 157 on a trigger 158 pivoted on a stationary pin 159 provided with a spring 161 for urging the right-hand end of the lever 158 carrying the pin 157 in the downward direction. A spring 162 may also be provided for urging the right-hand end of the lever 153 in a downward direction for maintaining the pick back lever 149 in the normal or inoperative position illustrated in Fig. 9. The fork 155 has an opening receiving a pin 163, shown also in Fig. 3, secured to a collar 164 axially slidable on the rod 114 between the stop nuts 165 and 166. The rod 114 is secured to a rod coupling member 167 axially slidable within an opening 168 in a stationary block 169. The opening 168 is of sufficient diameter to permit mounting a compression spring 171 around the portion of the rod 114 within the block 169. Secured to the member 167 is a link 172 connected at the end to a rock lever 173 (Fig. 10) having a stationary pivot 174 and carrying a fork 175 at the upper end adapted to cooperate with an annular groove 176 in the clutch part 77 of the one revolution clutch 77—78.

For locking the swing lever 139 and the stop motion shaft 45 in "stopped" position during the pick back operation, a link 177 is provided which is pivoted at 178. The right side (far side as viewed in Figs. 8, 9 and 10) of the lever 149 around the fixed pivot 151 is provided with a cam surface 179 upon which the lower edge of the link 177 is adapted to ride. The link 177 has a notch 181 at the end of the upper edge and has a second notch 183 along the lower edge. The link 177 has a stationary pivot 178. When the lever 149 is rotated clockwise rotating the cam surface 179 clockwise, the cam surface rides against the right-hand edge of the notch 183 and the link 177, causing the link 177 to be lifted and the notch 181 to engage the stationary pin 141, whereby the link 177 and the pick back arm 149 are locked in position as illustrated in Fig. 10 during the pick back operation.

When the pick back arm 149 was moved to the position of Fig. 10, the fork 155 was thereby moved to pull on the rod 172 to disengage the one revolution clutch parts 77 and 78. High points of these clutch parts ride by each other for one revolution, preventing the rod 172 from moving. Thus the pick-back arm is locked in its actuated position for one backward pick. When the clutch parts 77 and 78 have returned to their normal position, the spring 162 will break the linkage 153 and return the pick back lever to the normal position of Fig. 9.

Figure 11:
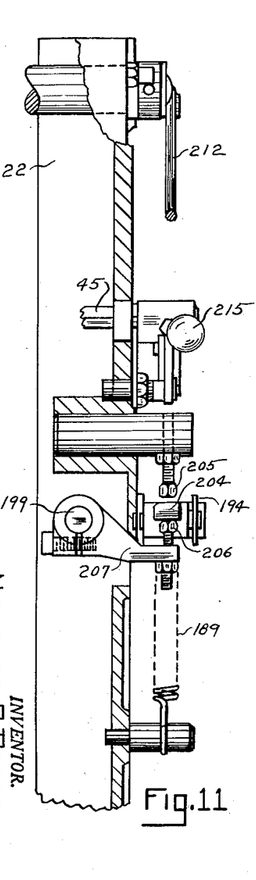
Fig. 11 is a view partially in cross-section of a portion of the master stop motion including particularly the details of the brake and clutch mechanism represented as cut by a plane 11—11 in Fig. 12.
Figure 12:
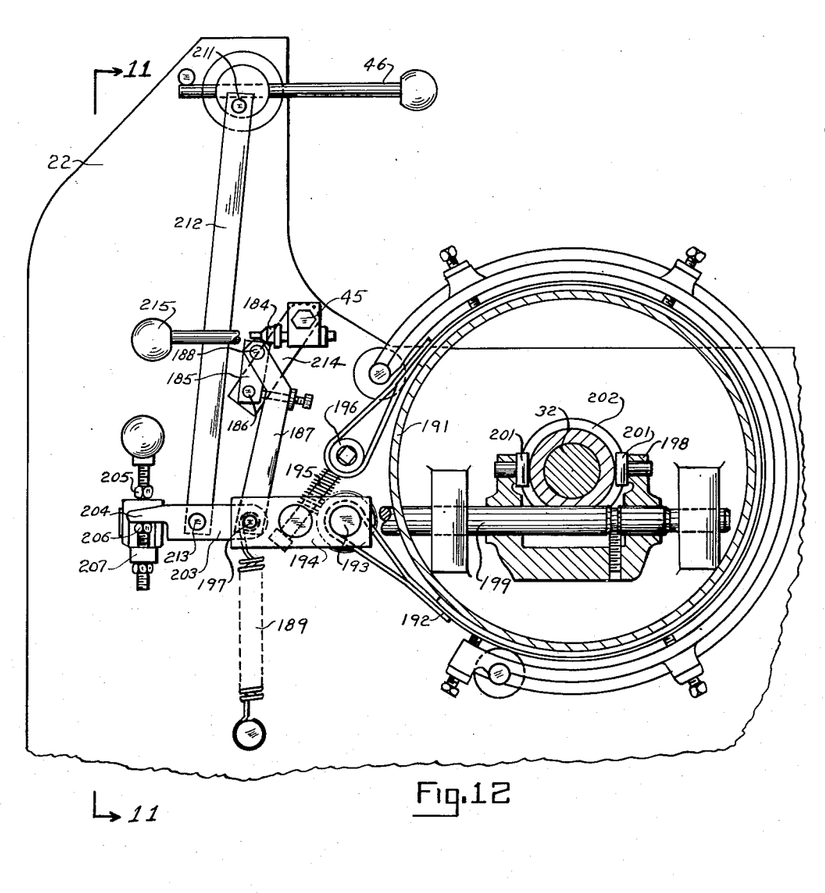
Fig. 12 is a view of the apparatus of Fig. 11 partially in cross-section as seen from the right and represented as cut by a plane 12—12 indicated in Fig. 1.

The clutch and brake mechanism within the housing 37 of Fig. 1 and the mechanism for operating them in response to rotation of the master stop shaft 45 are shown in Figs. 11 and 12. As illustrated therein, the stop shaft 45 carries an abutment pin 184 normally locking in place a brake linkage comprising a lever 185 having a pivot 186 and a second lever 187 pivotally secured to the lever 185 by a pin 188. For urging the lower end of the lever 187 downward there is a tension spring 189. The main brake for the main drive shaft 32 comprises a brake drum 191, with which cooperates a brake bank 192 secured at one end to a fixed pin 193. Pivotally mounted upon the fixed pin 193 there is a lever 194 carrying an adjustable link 195 to which is secured the opposite end 196 of the brake band 192. The lever 194 is pivotally secured at the left-hand end by a pin 197 to the lower end of the brake linkage lever 187.

The clutch within the housing 37 for the main drive shaft 32 comprises a yoke 198 carried by a rotatable, clutch-engaging and disengaging shaft 199 and carrying shoes 201 adapted to cooperate with an annular groove 202 of a conventional axially movable friction clutch.

For rotating the clutch-disengaging shaft 199 in response to rotation of the master stop shaft 45 to engage the clutch, a link 203 is provided which is pivoted at the right-hand end to the pin 197 in the end of the lever 194 and has a nose 204 at the left-hand end (referring to Figs. 11 and 12) adapted to ride between two abutments 205 and 206. The abutment 205 is fixed to the frame of the weaving machine and the abutment 206 is adjustably secured to the end of a crank 207 fixed upon the clutch disengagement shaft 199. A spring, not shown, is provided for turning the shaft 199 counterclockwise to the disengaging position when not held by the nose 204.

For manual operation of the brake band 192 and the clutch yoke 198, the manual start-stop lever 46 is mounted to be rotatable about a center and has a link 212 connected to the lever 46 by a pin 211 slightly off the pivot center of the lever 46 and connected at the lower end by a pivot pin 213 to the lever 203. A lever 214 is fixed to the master stop shaft 45 carrying the pivot pin 186 for the link 185. The shaft 45 also carries a handle 215.

The handle 46 is in the running position.

When stop shaft 45 is rotated in a clockwise direction the abutment pin 184 also rocks and lever 185 slips off the abutment pin 184 and is pulled downward by spring 189, the lever 194 is pivoted around pin 193 and sets the brake. The downward movement of lever 187 pivots link 203 around the pin 213 and nose 204 of link 203 goes up against abutment 205 releasing crank 207 and rotating shaft 199 to release the main drive shaft clutch.

The handle 215 is fixed to the stop shaft 45 and its movement upward will break the lock between the abutment pin 184 and the lever 185 and again produce the action above described.

The handle 46 is used to start the machine. Lifting the handle 46 lifts the lever 212 and since nose 204 of the link 203 is against abutment 205, it acts as a pivot point and the link 203 is restored to the position shown in Fig. 12 resetting the locking action between lever 185 and abutment pin 184.

The handle 46 can be used to release the clutch whenever stop rod 45 has not been rotated. Lifting handle 46 will lift lever 212 causing link 203 to pivot about pin 197 and lift the nose 204 of the link 203 away from abutment 206 up against abutment 205 taking the pressure off of crank 207 and thus releasing the clutch. In this operation the brake is not operated since lever 194 has not been moved from the position shown in Fig. 12.

Figure 13:
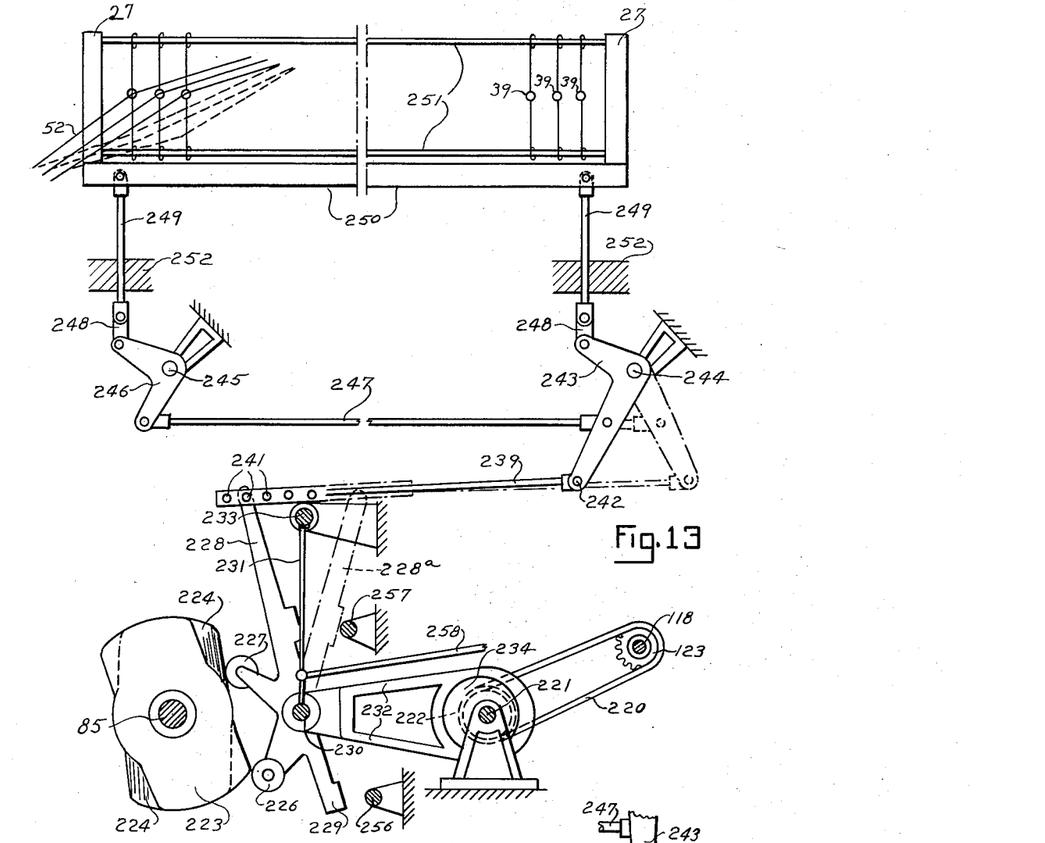
Fig. 13 is a schematic diagram of the shedding mechanism of the weaving machine showing the parts in the position for normal operation of the machine.

The shedding mechanism 29 has a control shaft 221 (Fig. 13) for opening and closing the shed, driven by the shaft 118 through a chain 220, the sprocket 123 and a sprocket 222 on the shaft 221. For convenience and simplicity the shedder control shaft 118 has been described as being driven by a half revolution clutch. The invention is obviously not limited thereto as the clutch may be arranged for some other fraction of a revolution or whole number of revolutions according to the speed relationship between the shafts 118 and 221. Where a one-half revolution clutch is employed, as described, the shedding mechanism is so constructed that there is a one to one speed ratio between the shafts 118 and 221. This is accomplished by making the sprockets 123 and 222 the same size, one revolution of the shaft 118 corresponding to one picking motion of the picking mechanism 41. As will be explained hereinafter, one-half revolution of the shaft 221 will be the required amount to open the shed which was previously closed or to close it if it was previously opened. This will become more apparent from the illustrative construction of the shedding mechanism, shown in Figs. 13 and 14. This comprises a plurality of cams 223—224, etc. for operating a plurality of heddle frames. The shape and relative angular positions of the cams 223—224, etc. are such as to produce the desired sequential operation of the heddle frames. This part of the mechanism is known to those skilled in the art and need not be further described. Only one of the heddle frames 27 is shown in Fig. 13, arranged to be driven by the cams 223 and 224. The cam 223 is carried by a shaft 85, shown in Fig. 8 as carrying the sprocket wheel 84. To cooperate with the cam 223 and 224 are suitable cam followers 226 and 227 carried by a lever 228 having end 229 overhanging its pivot. The lever 228 is pivotally secured to a shaft 230 which is, in turn, journaled in a bracket 232. The bracket 232 remains stationary during normal operation of the loom but is mounted upon an eccentric 234 carried by a shaft 221 also carrying the sprocket wheel 222. As previously explained, the sprocket wheel 222 has a chain 220 linking it with the sprocket wheel 123, which is mounted upon the shaft 118 shown in Fig. 8. As previously stated also, the shaft 118 is arranged to make one-half revolution and the gear ratio is such that the eccentric 234 make a half revolution whenever the clutch 122 of Fig. 8 is actuated by the solenoid 66 (Figs. 5 and 6).

When the eccentric 234 is in the position shown in Fig. 13, the lever 228 is oscillated by rotation of the cam 223 and thereby effects the heddle operation. As indicated, this takes place through a rod 239 pivoted at 241 to the upper end of the lever 228 and through additional linkage. Such a linkage, for example, may take the form of a bell-crank 243 pivoted at 242 to the rod 239, a link 248, a vertical rod or post 249 sliding in a bearing 252 and secured to the lower horizontal bar 250 of the heddle frame 27 which includes horizontal heald rods 251 for carrying the healds having the eyes 39. For supporting the opposite end of the bar 250, a duplicate set of rods 249 is provided and there is an additional bell-crank 246 pivoted at 245 and connected to the bell-crank 243 by a connecting rod 247. Stops 256 and 257 are provided in such a position that when the eccentric 234 is rotated one-half revolution to the position shown in Fig. 14, the lever ends 228 and 229 rest against the stops 256 and 257 bringing the heddles to neutral position and unaffected by the angular position of the cams 223, 224. Further rotation of the eccentric 234 through another half revolution restores the shedding mechanism to its original normal operating position. As a further safety precaution, if desired, a rod 258 may be provided for operating the central stop motion shaft 45 through a bell-crank (not shown) when the eccentric 234 is moved to the position shown in Fig. 14. Suitable means, such as a guide rod 231 pivoted at one end to a fixed pin 233 and at the other end to the shaft 230 is provided to prevent rotation of the bracket 232.

The operation of the apparatus in the form illustrated is as follows:

In order to re-start the apparatus after it has been shut down, the stop motion handle 215 and the start-stop handle 46 are brought to the position shown in Fig. 12. With the main clutch and main brake in the positions indicated by Figs. 11 and 12, the apparatus is in running condition. The motor 31 is rotating, driving the shaft 34 which rotates continuously during operation of the motor 31. The motor 31 is also driving the main shaft 32, which rotates whenever the control handles are in the position shown in Fig. 12. The picker shaft 74, being geared to the main drive shaft 32, is rotating whenever the main shaft 32 is rotating. It is to be understood that the picker mechanism and various other auxiliary devices not shown, such as the tucking mechanism and the cutting-off mechanism of a gripper shuttle type weaving machine are also driven by the picker shaft 74.

Figure 14:
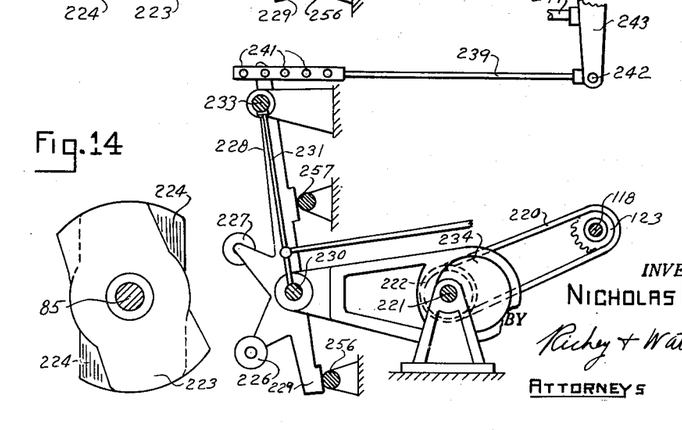
Fig. 14 is a partial view of the apparatus of Fig. 13 with the parts shown in the level shed or warp straightening position.

As shown in Fig. 8, under normal running conditions the one-revolution clutch parts 77, 78 are in engagement so that sprockets 82 and 84 are driven through the chain 83 by the picker shaft 74 and the sprocket 81. The take-up shaft 76, being keyed to sprocket 82, is also driven, causing the cloth beam 26 to be driven through the gearing 86 and causing the warp beam 50 to be driven through the take-up mechanism including the one way clutch 88, reciprocating arm 89, rod 93, the ratchet 95, 96 and the worm gearing 97 and 98. The shedder mechanism 28 is also driven by the rotation of the sprocket 84. All these mechanisms are illustrated in Fig. 8. As shown in Figs. 8, 13 and 14, the rotation of the sprocket 84 keyed on the shaft 85 causes rotation of the cams 223, and 224, which act on the cam followers 226 and 227 and the linkage including the bell-crank 243 and 246 to raise and lower the heddle frames 27.

In case there should be a failure of a warp thread, the drop wire 44 shown in Fig. 6 falls closing an electrical circuit by connecting the conductors 72 and 73. Likewise, in case there should be a failure of the weft thread, the electrical circuit is closed through the switch 70, electrically connecting the conductors 72 and 73. The electrical circuit so formed includes the secondary winding of the transformer 62 and the winding of a normally open contactor 61, the winding and contacts of a time delay relay 63, the conductors 72 and 73 back to the secondary winding of the transformer 62. Since the relay 63 is slow opening, the conductor 61 has time to pick up and close its contacts 64 and 65. The contacts 64 are holding contacts which maintain the relay 61 energized even though the operator in the meantime repairs the break in the warp or weft thread so as to open the circuit of the drop wire 44 or the weft-failure contact 70.

The closing of the contacts 65 energizes the solenoid winding 66 of the one-half revolution clutch 122 illustrated in Figs. 8 and 5. The time delay of the slow opening relay 63 is so chosen that it will not open until after the solenoid 66 has had ample time to lift the catch 128 and permit the driven shaft 118 of the one-half revolution clutch 122 to start rotating. The time delay is short enough however, so that the time delay relay 63 opens the circuit before the one-half revolution clutch and the shaft 118 have completed one-half of a revolution. Once the stop portion 125 or 126 of the one-half revolution clutch 122 has been released by the lifting of the catch 128, the one-half revolution clutch completes its operation of causing the shaft 118 to rotate through one-half revolution regardless of the electrical condition of the solenoid 66. As shown in Figs. 13 and 14, the rotation of the shaft 118 through one-half revolution rotates the eccentric 234 from the position for normal operation of the shedder drive as shown in Fig. 13 to the position for closed shed or lever warp condition represented in Fig. 14. This facilitates locating, repairing or re-threading of the broken or defective warp yarn.

The rotation of the one-half revolution clutch 122 also causes the rotation of the cam 132 and the lifting of the rod 135 whereby the lever 137 shown in Figs. 8, 9 and 10 is lifted into the path of the dog 136. The lever 137 is thereby driven to the left, rotating the lever 139 clockwise and causing the upper end 143 of the lever 139 to strike the block 142 of the stop motion shaft 45, thereby bringing the main shaft 32 to a stop and shutting down all the mechanism driven by the main shaft 32. The manner in which the rotation of the stop shaft 45 functions to release the main clutch and apply the main brake is illustrated in Figs. 11 and 12. As seen from the side of the apparatus as illustrated in Figs. 8, 9 and 10, the stop shaft 45 is rotated counterclockwise, but as seen from the side illustrated in Fig. 12, the shaft is rotated in the clockwise direction by the operations previously explained. Referring to Fig. 12 when the shaft 45 rotates in the clockwise direction, the abutment pin 184 rises, releasing the link 185. The rotation of the lever 214 carried by the stop shaft 45 also carries the pivot 186 for the link 185 slightly to the left whereby the spring 189 is permitted to draw the link 187 down with great rapidity, thereby rotating the brake-operating arm 194 counterclockwise around its stationary pivot 193. This tightens the brake band 192 around the drum 191 and brings the main shaft 32 to an immediate stop, the clutch having been simultaneously disengaged.

The means whereby the disengagement of the drive clutch took place is illustrated in Fig. 11. The downward motion of the pin 197 at the upper end of the spring 189 when the linkage 186, 187 is released causes the link 203 to rotate clockwise around the pivot pin 213 which is stationary for the moment, causing the nose 204 to rise and allow the lever 207 and the clutch control shaft 199 to rotate counterclockwise as seen in Fig. 11 under the force of a spring, not shown, to disengage the clutch.

Should there have been a weft thread failure necessitating the removal of all or part of the last weft thread which was beaten in, the operator pulls down the pick-back handle 149 shown in Figs. 8, 9 and 10 so as to obtain a single pick back or a reverse operation of the shedding mechanism and of the other parts of the weaving machine for a single pick. The downward movement of the handle 149 also produces a further one-half revolution of the one-half revolution clutch so as to re-open the shed to enable the defective weft thread to be removed. The further one-half rotation of the one-half revolution clutch 122 results from the closing of the contacts 67 of the limit switch 68, which is mounted in the path of the lower end of the pick-back handle 149. The operation of the one-half revolution clutch and the further rotation through one-half revolution of the shaft 118 takes place as previously described.

Assuming that the cams 223 and 224 are then in the closed shed position, further rotation through one-half revolution of the shaft 118 re-opens the shed for the reason that the one-half revolution of the eccentric 234 shown in Fig. 14 restores the shedding apparatus to the operating condition illustrated in Fig. 13.

The pick-back operation results from the action of the pick-back lever 149 on the lever 153 and the fork 155. The latter two parts are rotated counterclockwise when the handle of the lever 149 is drawn down. The parts are thus moved from the position illustrated in Fig. 9 to that shown in Fig. 10. When the notch 156 releases the pin 157 of the trigger 158, the right hand end of the trigger 158 is permitted to snap down under the action of the spring 161 and catch the corner of sleeve 113 of the clutch yoke 112 by the hook 160.

As the fork 155 is rotating counterclockwise after releasing trigger 158 it moves pin 163 to the right and also moves rod coupling 167 (Fig. 3) and rod 172 to the right as viewed in Fig. 10. Since the sleeve 113 is being held by trigger 158 and rod coupling 167 is being moved to the right, spring 171 on pin 114 is compressed. Simultaneously, the left hand end of the rod 172 rotates the lever 173 counterclockwise around the pivot pin 174 so as to force to the left, against the force of the spring 79, the driven portion 77 of the one revolution clutch 77, 78. This releases the free running portion 78 of the one revolution clutch so as to permit the chain 83 and the sprocket 84 to be driven in a reversed direction.

The portion 77 of the one revolution clutch 77—78 is held in the opened position momentarily by the operator until the high points of the portion 77 and 78 ride over each other. If desired, a schematically represented pawl 80 may be provided to hold the clutch parts 77 and 78 apart for one revolution as soon as they are separated. The operator releases the pick back handle 149 as soon as the clutch parts 77 and 78 separate and the spring 162 (omitted for clarity from Figs. 8 and 10 but shown in Fig. 9) pulls down on the linkage 153 and 152 to return the fork 155 to the position shown in Figs. 8 and 9. When fork 155 returns to its normal position the notch 156 (Fig. 10) engages the pin 157 and lifts the trigger 158 thereby releasing the sleeve 113. The spring 171 is thereby freed and expands to the right as shown in Fig. 3 and moves sleeve 113 to the right which by its yoke 112 moves the driven portion 109 of the clutch 107 into engagement with the constantly rotating portion 108. Since the driving portion 108 of the clutch is moving in a reverse direction to the picker shaft 74, a reverse rotation is imparted to the shaft 76. This reverse rotation takes place as a result of the fact the sprocket 115 is secured to the part 108, which is connected by the chain 116 to the continuously running sprocket 117. The latter is so connected to the continuous running shaft 34 that it runs in the opposite direction from the picker shaft 74.

Reverse direction of the rotation of the shaft 76, having caused the reversed rotation of the sprocket 84 and the shaft 85 of the shedder mechanism, has brought the heddle eyes into the position which they occupied during the next preceding pick so that the shed is re-opened with the defective weft thread cleared and in condition to be removed from the shed by the operator. The reversed rotation of the take-up shaft 76 has also unwound the cloth beam 26 an amount corresponding to a single pick, thereby bringing the cloth beam into the proper position for resuming weaving operations after the defective yarns have been cleared, replaced or repaired.

The take-up means is so constructed, however, that the reversed rotation of the take-up shaft 76 does not re-wind the warp threads on the warp beam. The warp beam and the take-up mechanism merely remains stationary. This results from the fact that the clutch 88 connecting the take-up shaft 76 to the driving parts of the let-off mechanism is a one way clutch and does not drive these parts when it rotates in the reversed direction.

When the clutch member 77 has completed one revolution in the reverse direction, the clutch member 77 is snapped into engagement with its mating member 78 owing to the action of the heavy spring 79. The reengagement of clutch members 77 and 78 pivots lever 173 on pin 174 back to its normal position as shown in Figs. 8 and 9, this in turn moves rod 172 to the left and eliminates the pressure of spring 171 upon the sleeve 113. The movement of rod 172 also moves the rod 114 to the left and stop nuts 166 upon the rod 114 move sleeve 113 to the left thus disengaging reverse clutch members 108 and 109. The take-up shaft 76 comes to a stop after it has completed one revolution in the reversal direction. Since the main drive shaft 32 has been stopped, nothing further happens.

It will be observed that the shed may be flattened manually if desired by the operation of the pick back handle 149. In this case, a second operation is required in order to re-open the shed.

After the apparatus has been shut down as a result of the operation of the stop shaft 45 in response to warp or weft failure as described, or some other failure acting upon the stop shaft 45 (not herein described, as it does not constitute a part of the present invention), or after the apparatus has been shut down manually, it is restarted by the operation of the stop-start lever 46. The handle 46 is first raised. This releases the brake band 192 by stretching the spring 189 and lifting the pins 213 and 197. Since the nose 204 strikes against the upper fixed abutment 205 shown in Fig. 11, the lifting action of the pin 213 also forces the pin 197 upward. (When the apparatus was shut down, the counterclockwise rotation of the shaft 45 had raised the handle 215. This handle falls by reason of its weight to the normal running position illustrated in Fig. 12 thereby cocking the linkage 186, 187 and locking the link 185 under the abutment pin 184.) The start-stop handle 46 is thereupon returned to the downward position, the pin 197 is now a fixed pivot and the link 203 is caused to pivot around it. Consequently, this brings about downward motion of the pin 213. As the handle 46 is restored to the downward position, as illustrated, it causes the nose 204 to move downward, bearing downward against the abutment 206 secured to the clutch operating lever 207, rotating the clutch shaft 199 clockwise as illustrated in Fig. 11 and reengaging the clutch. The apparatus is now in normal running condition.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention which is defined in the appended claims.

What is claimed is:

1. In weaving machinery, a main shaft, a driving motor, a clutch between said motor and said shaft, a brake on said shaft, a picker shaft, a take-up shaft, a one-revolution clutch between said picker shaft and said take-up shaft, a shedder driven by said take-up shaft, said shedder having a closing and opening mechanism with a control shaft for operating said mechanism to effect warp straightening, a half-revolution engageable clutch between said driving motor and said shedder-control shaft, warp-drop wires for causing engagement of said half-revolution clutch upon failure of a warp thread, a reverse drive mechanism so connected as to drive said take-up shaft in a direction, the reverse of that of the main shaft, said reverse drive mechanism including a normally disengaged, toothed clutch between said motor shaft and said take-up shaft and a linkage for simultaneously disengaging said one revolution clutch and engaging said toothed clutch while said one revolution clutch remains disengaged, stop motion responsive to actuation of said half-revolution clutch for opening the clutch between the driving motor and the main shaft and applying said brake, whereby warp failure results in loom shut-down, and warp straightening, and a manual control for actuating said reverse drive clutch linkage to effect pick back for single pick, said manual control having a pair of switch contacts therein paralleling said drop wires for re-energizing said half-revolution clutch and reopening the shed.

2. In weaving machinery, a driving motor, a picker shaft driven thereby, a take-up shaft, a one revolution clutch between said picker shaft and said take-up shaft, a shedder driven by said take-up shaft, said shedder having a closing and opening mechanism with a control shaft for operating said mechanism to effect warp straightening, a half-revolution engageable clutch between said driving motor and said shedder-control shaft, warp drop wires for causing engagement of said half-revolution clutch upon failure of a warp thread whereby warp failure results in warp straightening, a reverse drive mechanism so connected as to drive said take-up shaft in a direction, the reverse of that of the picker shaft, said reverse drive mechanism including a normally disengaged toothed clutch between said motor shaft and said take-up shaft and a linkage for simultaneously disengaging said one-revolution clutch and engaging said toothed clutch while said one-revolution clutch remains disengaged, and a manual control for actuation of said reverse drive linkage to effect pick back for a single pick.

3. In weaving machinery, a picker shaft, a take-up shaft, a one-revolution clutch between said picker shaft and said take-up shaft, a shedder driven by said take-up shaft, a thread-break detector, a shed closer responsive to said thread-break detector, whereby thread breakage results in warp straightening, a reverse drive mechanism so connected as to drive said take-up shaft in a direction the reverse of that produced by the picker shaft, a normally disengaged toothed clutch between said reverse drive mechanism and said take-up shaft, and a linkage for simultaneously disengaging said one-revolution clutch and engaging said toothed clutch while said one-revolution clutch remains disengaged to effect pick back for a single pick.

4. In weaving machinery, a picker shaft, a take-up shaft, a one-revolution clutch between said picker shaft and said take-up shaft, a shedder driven by said take-up shaft, a thread-break detector, a shed closer responsive to said thread-break detector, whereby thread breakage results in warp straightening a reverse drive mechanism so connected as to drive said take-up shaft in a direction the reverse of that produced by the picker shaft, and a normally disengaged toothed clutch between said reverse drive mechanism and said take-up shaft, a linkage for simultaneously disengaging said one-revolution clutch and engaging said toothed clutch while said one-revolution clutch remains disengaged, to effect pick-back for a single pick, said linkage having a control element therein for operating the shed-closer to reopen the shed.

5. In weaving machinery, a driving shaft, a shedder having a shed-closing shaft operable by being driven one-half revolution, a half-revolution clutch having a solenoid operated actuating member, said clutch being interposed between said driving shaft and said shed-closing shaft, and a thread-break detector including drop wires in circuit with said solenoid, whereby a thread break connects said solenoid for actuating said shed-closer to render said shedder ineffective.

6. In weaving machinery, a main shaft, a driving motor, a clutch between said motor and said shaft, a brake on said shaft, a picker shaft, a take-up shaft, a shedder driven by said take-up shaft, said shedder having a closing and opening mechanism with a control shaft for operating said mechanism to effect warp straightening, a half-revolution engageable clutch between said driving motor and said shedder-control shaft, warp-drop wires for causing engagement of said half-revolution clutch upon failure of a warp thread, and stop motion responsive to actuation of said mechanism for opening the clutch between the driving motor and the main shaft and applying said brake, whereby warp failure results in loom shut-down and warp straightening.

7. In weaving machinery, a driving motor, a take-up shaft, a shedder driven by said take-up shaft, said shedder having a closing shaft, a half-revolution engageable clutch between said driving motor and said shedder-closing shaft, and warp-drop wires for causing engagement of said half-revolution clutch upon failure of a warp thread.

8. In weaving machinery, a main shaft, a driving motor, a clutch between said motor and said shaft, a brake on said shaft, a picker shaft, a take-up shaft, a one-revolution clutch between said picker shaft and said take-up shaft, a shedder driven by said take-up shaft, a normally disengaged toothed clutch between said motor and said take-up shaft, a reverse drive mechanism so connected as to drive said take-up shaft in a direction, the reverse of that of the main shaft, mechanism for simultaneously disengaging said one revolution clutch and engaging said toothed clutch while said one-revolution clutch remains disengaged, and stop motion responsive to actuation of said reverse drive mechanism for opening the clutch between the driving motor and the main shaft and applying said brake, to bring about loom shut-down.

9. In weaving machinery, a driving motor, a shedder, said shedder having a closing and opening mechanism with a control shaft, an engageable clutch between said driving motor and said shedder-control shaft, and warp-drop wires for causing engagement of said clutch upon failure of a warp thread.

10. In weaving machinery, a driving motor, a picker shaft driven thereby, a take-up shaft, a one-revolution clutch between said picker shaft and said take-up shaft, a shedder driven by said take-up shaft, a normally disengaged toothed clutch between said motor and said take-up shaft, a reverse drive mechanism so connected as to drive said take-up shaft in a direction, the reverse of that of the picker shaft, and mechanism for simultaneously disengaging said one revolution clutch and engaging said toothed clutch while said one-revolution clutch remains disengaged.

11. In weaving machinery, a driving motor, a shedder, said shedder having a closing and opening mechanism with a control shaft, a half-revolution engageable clutch between said driving motor and said shedder-control shaft, and mechanism for causing engagement of the half-revolution clutch.

12. In weaving machinery, an electrical stop circuit comprising in combination a pair of conductors adapted to be connected to a source of electrical current, a pair of contacts adapted to close in response to yarn failure in a textile machine, a normally open contactor having a winding connected in series with said conductors, having a pair of normally open contacts to serve as closing contacts connected to said yarn failure contacts and having a second pair of normally open contacts, a shut-down initiating solenoid having a winding in series with said second pair of normally open contacts and said current supply conductors, and a slow opening normally closed relay having a winding in series with said contactor windings and having normally closed contacts in series with said windings.

13. In weaving machinery, a shedder having a control shaft adapted to retain the heddle frames in closed-shed position when said control shaft is rotated a half-revolution, a half-revolution clutch, a driving motor connected to said shedder control shaft through said half-revolution clutch, a main shaft for driving weaving machinery carrying a dog, a stop motion with a notch linkage having a notch to be put into the path of said dog by the operation of said half-revolution clutch, and a main clutch between the said motor and said main shaft disengaged by operation of said stop motion by said dog.

14. In weaving machinery, a shedder having a control shaft adapted to shift the shedder from normally operating to closed shed position and vice versa by successive half-revolutions of the control shaft, a driving motor, a half-revolution clutch between the said driving motor and said control shaft, a reversing handle for connecting the shedder to the driving motor with a reverse direction of rotation and mechanism responsive to motion of said reversing handle for actuating said half-revolution clutch, to reopen the shed after a closing.

15. In weaving machinery, a take-up shaft, a cloth beam, gearing between the take-up shaft and the cloth beam, a warp beam, let-off mechanism between the take-up shaft and the warp beam, a one-way clutch between the said take-up shaft and said let-off mechanism whereby reverse rotation of the take-up shaft serves to unwind the cloth beam without rewinding the warp beam.

16. In weaving machinery, a continuously running reverse rotation shaft, a reversing handle, a take-up shaft adapted to drive take-up, let-off, and shedding mechanism, disengageable means for driving said shaft in the normally running direction, an engageable clutch interposed between said take-up shaft and said reverse running shaft, spring pressed means for holding the parts of the engageable clutch apart, linkage secured to the handle for forcing said parts together and mechanism for retaining said spring and said handle in the engaged position of the engageable clutch for a single revolution.

17. In weaving machinery, a continuously running reverse-rotation auxiliary shaft, a reversing handle, a take-up shaft adapted to drive take-up, let-off, and shedding mechanism, disengageable means for driving said shaft in the normally running direction, an engageable clutch interposed between said take-up shaft and said reverse-rotation auxiliary shaft, spring pressed means for holding the parts of the engageable clutch apart, a linkage connected to the reversing handle for forcing said parts together, a mechanism for retaining said spring and said handle in the engaged position of the engageable clutch for a single revolution, a member movable with the movable part of the engageable clutch and a catch for holding said member against the force of said spring.

18. In weaving machinery, a main clutch having a control shaft adapted to engage the clutch when the shaft is rotated in the clockwise position, a main brake having a control arm adapted to apply the brake when the arm is rotated in the counterclockwise direction, a spring intended to rotate said arm in said counterclockwise direction, a stop motion shaft, an arm secured thereto carrying an abutment pin and a pivot pin, a pair of links joined by a second pivot pin, one link being pivoted at the one end to the first pivot pin on stop motion arm and the other link being pivoted at one end to the end of the brake control arm, a start-stop handle for rotating said brake control arm in the brake releasing position against the force of the spring, whereby said links are cocked and may be locked under said abutment pin and a link pivoted to said brake control arm at one end and having a nose at the opposite end adapted to move said clutch control shaft in the engaging position.

NICHOLAS P. DARASH.

References Cited in the file of this patent

UNITED STATES PATENTS

| Number | Name | Date |
| --- | --- | --- |
| 467,036 | Maertens | Jan. 12, 1892 |
| 891,618 | Hollingworth | June 23, 1908 |
| 943,028 | Landry | Dec. 14, 1909 |
| 1,071,245 | Landry | Aug. 26, 1913 |
| 1,759,673 | Thatcher | May 20, 1930 |
| 2,148,700 | Lohsse | Feb. 28, 1939 |
| 2,421,539 | Clarke | June 3, 1947 |
| 2,439,031 | Wilson | Apr. 6, 1948 |
| 2,452,380 | Kronoff et al. | Oct. 26, 1948 |

FOREIGN PATENTS

| Number | Country | Date |
| --- | --- | --- |
| 6,249 | Great Britain | of 1914 |